N. R. & O. G. MERCHANT.
Seed-Planter.
No. 1,366.                          Patented Oct. 12, 1839.
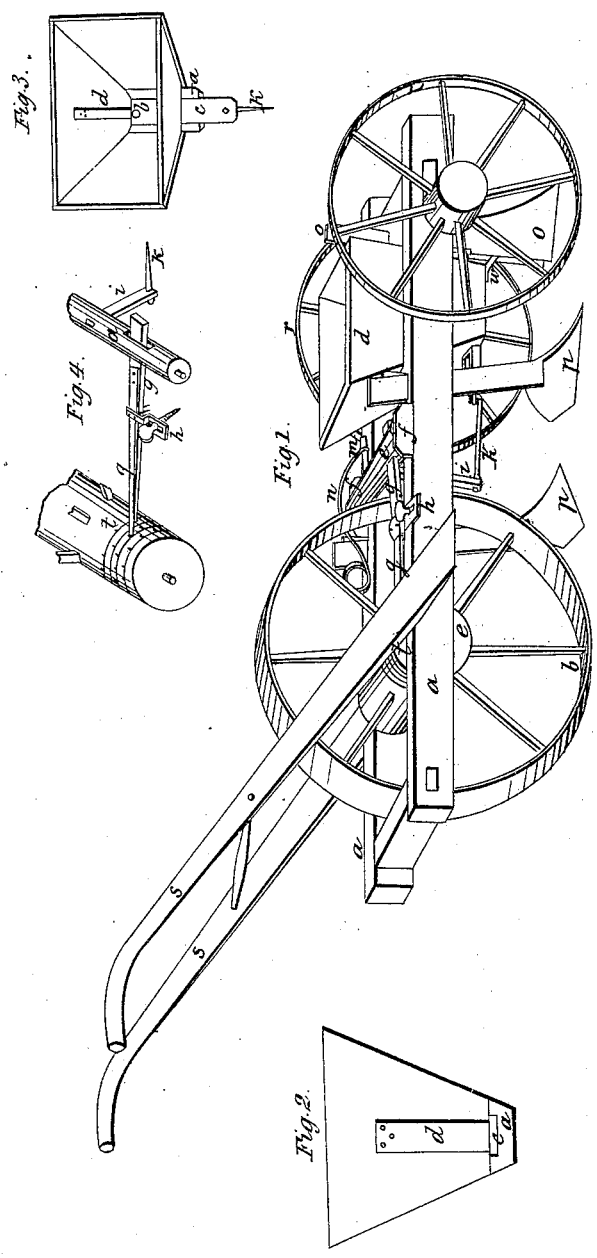

UNITED STATES PATENT OFFICE.

NIRAM R. MERCHANT AND O. G. MERCHANT, OF GUILFORD, NEW YORK.

IMPROVEMENT IN MACHINES FOR PLANTING CORN.

Specification forming part of Letters Patent No. 1,366, dated October 12, 1839.

*To all whom it may concern:*

Be it known that we, NIRAM R. MERCHANT and ORIN G. MERCHANT, of Guilford, county of Chenango, and State of New York, have invented a new and Improved Machine for Planting Corn and other Seeds; and we do hereby declare that the following is a full and exact description.

The nature of our invention consists of a machine that drops the corn at any required distance or quantity at a time, and in making the furrow, dropping, covering, and rolling down at one operation.

To enable others skilled in the art to make and use our invention, we will proceed to describe its construction and operation.

We first make a frame, *a a*, three feet nine inches long and ten inches wide inside; the side pieces, three by four inches square, set edgewise; the forward cross-piece four by six inches; the back cross-piece two by four inches.

*b*, Figure 1, is a wheel of two feet or more in diameter and set near the back end of the frame. The rim may be of iron four or five inches wide.

*c* is the hub of the wheel, seven or eight inches diameter. Around this hub, and near one end, are several rows of cogs, (marked *t* in Figs. 1 and 4.) In one row there are two, in the next three, and in the third four cogs.

The wheel *b*, turning once round in its forward motion, traverses about six feet of ground. The seed is dropped within this space according to the row of cogs upon the hub of the wheel which may be brought in contact with the lever, as hereinafter described. Thus the row of two cogs will drop once in three feet, the one with three cogs once in two feet, the one with four cogs once in one and a half foot.

*g*, Figs. 1 and 4, is a lever, one end mortised into the roller at *e*, through which at *a*, Fig. 4, is a pivot, which, with corresponding room in the mortise of the roller *e*, Fig. 1, allows to the lever a horizontal movement only without moving the roller. The other end of the lever reaches to the end of the cogs in the hub *c*, but not near enough to touch them. To enable the cogs to act upon the lever a stiff spring at *q*, Figs. 1 and 4, is fastened on the upper side, near the pivot end of the lever, and reaches about one-half an inch beyond the other end; thereby allowing the cogs to act upon it. The use of the spring is to allow a retrograde movement of the machine, the cogs in that case raising the spring without moving the lever.

*h*, Figs. 1 and 4, is a clasp, through which, near one end, is a mortise which admits a thumb-screw, confining it to the frame of the machine. At the other end of the clasp are two pins projecting downward, between which the lever plays vertically. By this clasp the lever is removed to and confined at either row of cogs on the hub required to be used, the horizontal movement of the lever in the roller before described allowing the clasp to be set at pleasure.

*e*, Fig. 1, is a roller with pivots working in the blocks *f f*.

*i* is an arm, Figs. 1 and 4, projecting downward from the roller, to which is attached an iron rod, *k*, Figs. 1, 3, and 4, said rod lying in a horizontal position, and fastened at the other end to the slide by a screw.

*c*, Figs. 1 and 3, is a slide at the bottom of the hopper three-eighths of an inch in thickness and one and a half inch wide. Through this slide is a hole at *b*, Fig. 3, of a size sufficient to contain the quantity of seed to be dropped at a time. Slides with different-sized holes in them may be used, as the kind of seeds to be planted may require.

*d*, Fig. 1, is a hopper for the reception of the seeds to be planted, of which Fig. 2 is a back view of the forward end, it being a vertical section. Fig. 3 is a back view of the same complete. This hopper has a solid bottom, *a*, Figs. 2 and 3, with a groove in the upper side which admits the slide.

*d*, Figs. 2 and 3, is a flat spring fastened to the forward end of the hopper, the wood being cut away to allow the lower end of the spring a horizontal movement.

*m*, Fig. 1, is an arm projecting forward horizontally from the roller *e*.

*n* is a spring bearing upon said arm.

*o o* is a cast-iron colter with wings.

*p p* are cast-iron molders, the one placed eight or ten inches back of the other to prevent clogging.

*r r* are wheels to support the forward end of the machine.

*s s* are handles to the machine.

*w* is the spout under the hopper.

Operation of the machine: When the machine is moved forward the cogs *t* bear upon the spring *q*, which moves the lever *g*, which gives motion to the roller e, consequently moving the arm i, which moves forward the rod k, this moving the slide c carrying the seeds which the hole in the slide may contain beyond the spring d. Should any seed be caught against the back part of the hole in the slide, the spring d gives way and allows it to pass without breaking the seed or checking the motion of the slide. As each of the cogs t passes the spring q upon the lever g, the spring n, Fig. 1, by pressing upon the arm m, Fig. 1, returns the slide to its original position. After passing the spring d the seeds are conveyed by the spout w and drop directly between the wings of the colter to the bottom of the furrow. The molders then turn the earth upon the seeds. The wheel b then passes over and presses the earth upon said seeds and closes the operation.

What we claim as our invention, and desire to secure by letters Patent, is—

The manner of varying the distance of dropping the seeds by changing the lever to different rows of cogs in the hub, substantially as above described.

NIRAM R. MERCHANT.
ORIN G. MERCHANT.

Witnesses:
ANDREW BRADBURY,
DANIEL P. CABLE.